(12) United States Patent
Zhigang et al.

(10) Patent No.: US 8,699,010 B2
(45) Date of Patent: Apr. 15, 2014

(54) EXAMINATION KIT FOR POLARIZED LENS

(75) Inventors: Zhao Zhigang, Zhenjiang (CN); Yin Feng, Zhenjiang (CN)

(73) Assignee: Zenni Optical, Inc., Novato, CA (US)

( * ) Notice: Subject to any disclaimer, the term of this patent is extended or adjusted under 35 U.S.C. 154(b) by 333 days.

(21) Appl. No.: 13/299,344

(22) Filed: Nov. 17, 2011

(65) Prior Publication Data
US 2012/0300193 A1  Nov. 29, 2012

(51) Int. Cl.
*G01J 4/00* (2006.01)
*G01B 9/00* (2006.01)

(52) U.S. Cl.
USPC .............................. 356/35; 356/364; 356/124

(58) Field of Classification Search
CPC ............................ G01M 11/0228; G01B 11/16
USPC .................................. 356/124–127, 364–370
See application file for complete search history.

(56) References Cited

U.S. PATENT DOCUMENTS

| | | | | |
|---|---|---|---|---|
| 3,861,048 | A | * | 1/1975 | Thompson ....................... 33/507 |
| 4,131,365 | A | * | 12/1978 | Pryor ............................. 356/505 |
| 4,515,443 | A | * | 5/1985 | Bly ................................ 359/246 |
| 4,655,589 | A | | 4/1987 | Cestaro et al. |
| 7,453,558 | B2 | * | 11/2008 | Koest ............................. 356/128 |
| 7,580,122 | B2 | | 8/2009 | Huang et al. |
| 2004/0075826 | A1 | * | 4/2004 | Ro et al. ........................ 356/73.1 |

* cited by examiner

*Primary Examiner* — Gregory J Toatley
*Assistant Examiner* — Maurice Smith
(74) *Attorney, Agent, or Firm* — Steven A. Nielsen; Allman & Nielsen, P.C.

(57) ABSTRACT

An examination kit allows for discovery of the axis of direction and stress areas of polarized lenses. The kit comprises a lower light box with a transparent work surface, two polarized film sheets, a dial gauge with notches defining allowable variation of axis direction and an upper polarized lens for viewing the tested polarized lens in various states and positions.

6 Claims, 3 Drawing Sheets

EXAMINATION KIT FOR POLARIZED LENS

RELATED PATENT APPLICATION AND INCORPORATION BY REFERENCE

This is a utility application based upon China patent application Ser. No. ZL 2010 2 0610215.2 filed on flied on Nov. 17, 2010. This related application is incorporated herein by reference and made a part of this application. If any conflict arises between the disclosure of the invention in this utility application and that in the related application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to means and methods of testing magnitudes of stress and the axis polarization of optical lenses. More particularly, the invention relates to a novel kit and method of simultaneously testing the axis of polarization and levels of stress of an optical lens.

(2) Description of the Related Art

Complex means and methods of separately testing optical lenses for polarization or stress are known in the related art. For example, U.S. Pat. No. 7,580,122 issued on Aug. 25, 2009 to Huang et al discloses a lens inspection device using polarized light beam, phase retardation plate and lookup table of color values. The Huang patent is cumbersome as referring to a lookup table to compare reference colors to observed colors it tiresome and inefficient.

U.S. Pat. No. 4,655,589 issued on Apr. 7, 1987 to Cestaro et al discloses the use of scattered light, a prism, a TV camera and other expensive equipment to measure stress across a glass sheet. The Cestaro patent fails to provide economical means or methods of testing transparent material for stress. Thus, there is a need in the art for efficient means of checking the axis of polarization and stress of polarized lenses.

BRIEF SUMMARY OF THE INVENTION

The present invention overcomes shortfalls in the related art by presenting an unobvious and unique combination, configuration and use of polarized light, dial gauges, sheets of polarized film, notch elements and other components to perform simultaneous tests for both polarization and stress of a tested polarized lens. In the prior art, polarized optical lenses are separately tested for stress and polarization using separate and bulky systems.

A disclosed embodiment of the invention includes and uses sheets of polarized film that are rotated upon a light box and under a tested polarized lens. After the brightest points of light are observed, the tested lens is rotated until the observed point becomes dark brown or some other designated color. The angle of rotation is recorded as well as the lens thickness at the observed point allowing for stress proprieties to be calculated. During this stress measurement procedure, the axis of polarization may also be observed. A notch area of a holder or dial gauge may define the boundaries of acceptable angles of polarization.

Figure 1:
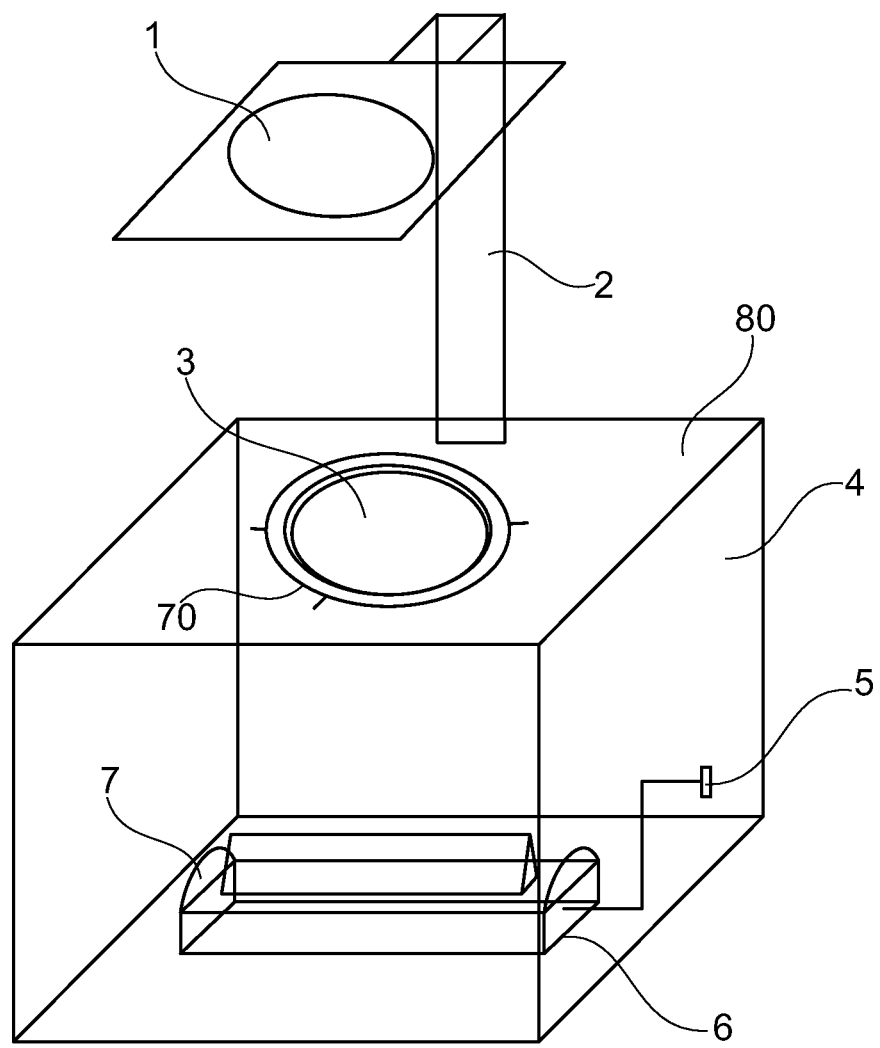
FIG. 1 depicts one embodiment of the invention.

REFERENCE NUMERALS IN THE DRAWINGS 1 an upper polarized lens sometimes used to observe the tested lens 3 resting upon the transparent work surface of the light box
2 an adjustable bracket used to secure the upper polarized lens
3 a tested polarized lens
4 a light box
5 a main power switch
6 a lamp holder
7 a light source or light bulb
20 a first polarized film
21 a second polarized film
30 a vector in line or parallel with the polarization of a polarized film, 20 or 21
40 an axis of polarization of a polarized lens
50 a first notch of the dial gauge
51 a second notch of the dial gauge
60 a center line passing through the first notch 50 and second notch 51
70 a dial gauge having a first notch and a second notch
80 glass top or transparent work surface found upon the light box 4
90 a center line
100 vectors of observation These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms.

Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

In general, embodiments of the disclosed systems and methods use a first polarized lens or an upper polarized lens 1 in an elevated position over a light box 4. A glass top or transparent work surface upon the light box supports a dial gauge 70, polarized sheets or polarized films 20, 21 or polarized sheets mounted upon glass, and a dial gauge 70 having a first notch 50 and a second notch 51. In general, embodiments of the invention use the directional and filtering properties of polarization to test the axis of polarization and areas of stress found within a tested polarized lens.

Referring to FIG. 1, a system for examination of polarized lenses comprises a light box 4, a light source or light bulb 7, a lamp or light holder 6, a main power switch 5, a polarized lens to be tested 3, a glass or transparent surface 80 upon the box 4. A dial gauge 70 has a first notch 50 and a second notch 51. An adjustable bracket 2 is disposed upon a back side of the light box and a first polarized lens or an upper polarized lens 1 may be set upon a top end of the bracket.

Figure 2:
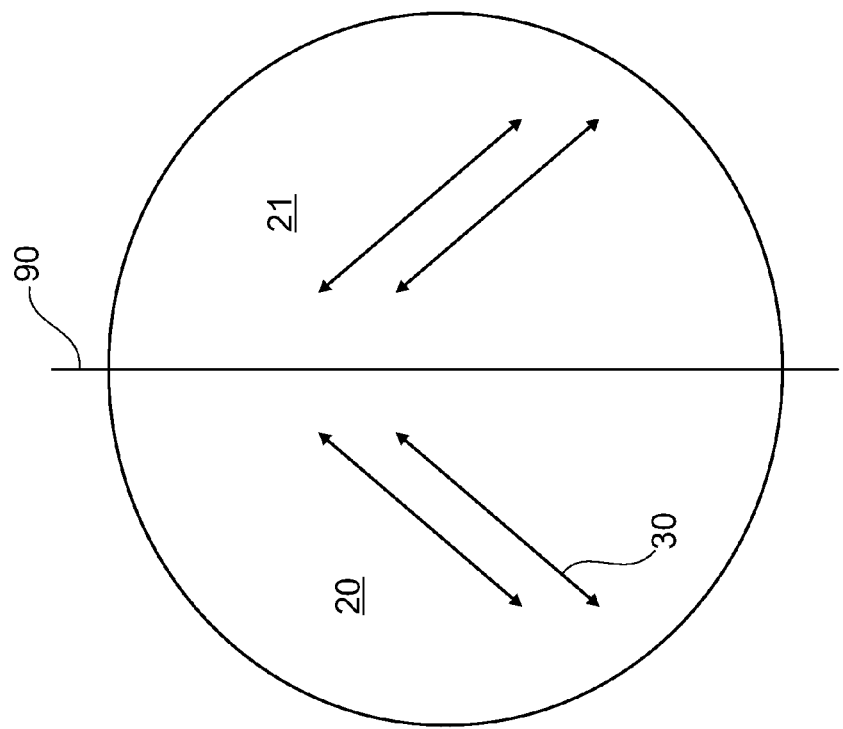
FIG. 2 depicts two polarized sheets placed at 45 degrees from a center line

Referring to FIG. 2, a first polarized film 20 or polarized sheet mounted upon a piece of glass is first positioned at a 45 degree angle from an intended axis line of a tested polarized lens 3.

In one contemplated method, the axis direction of a polarized lens may be found as follows:

A lens 3 to be tested is placed upon or near the glass top of the box. A reference line 90 is used to place a first polarizing film 20 and a second polarizing film 21 such that their respective vectors 30 are at a 45 degree angle from the center line 90.

The polarizing films 20 and 21 are then rotated such that so that the colors on either side of the center line 90 become darker to the same degree. Then the direction parallel to the center line is the axis direction.

Figure 3:
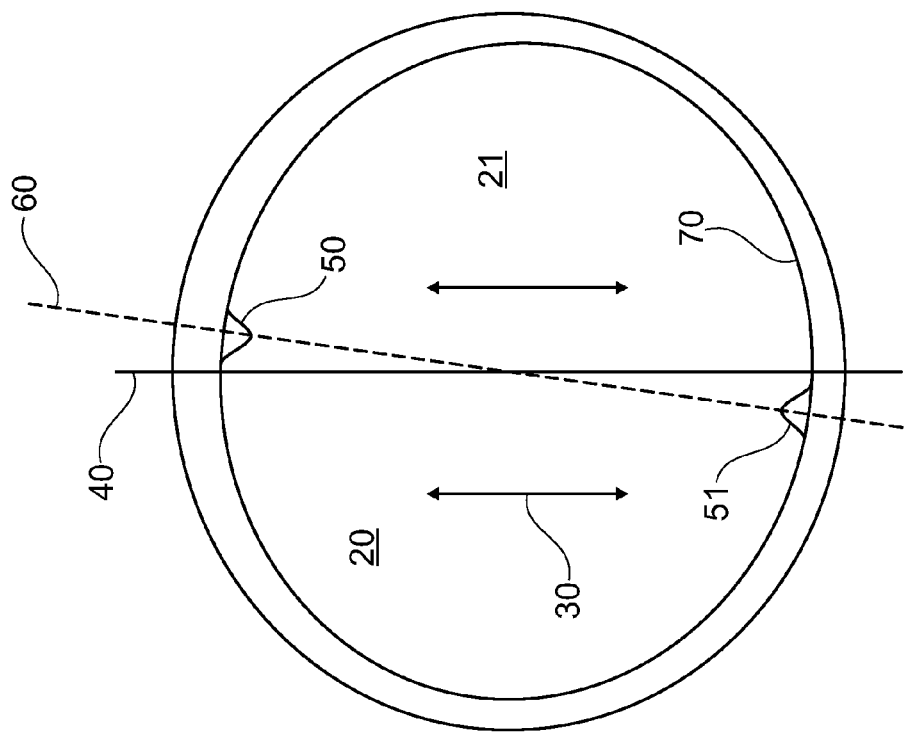
FIG. 3 depicts a two polarized sheets rotated to show a measured axis vector or line outside of a notch area.

Referring to FIG. 3, a measured centerline 40 or found axis of polarization was obtained by rotating the film sheets as explained above. In the example shown in FIG. 3, the found axis of polarization 40 is outside of the first notch 50 and second notch 51 of the dial gauge. In the illustrated example of FIG. 3, the tested lens falls outside of the test standard and would not be used. In the preferred embodiment, the angle of acceptable deviation is between 1 and 4 degrees. The intended axis of production is shown as a centerline 60 passing through the center areas of the first and second notches. Vectors 30 illustrate the measured direction of axis polarization found by rotating the polarized sheets until the observed darkness through the tested lens, on either side of the centerline is the same.

In finding the axis of polarization of the tested lens 3, an operator may view the tested lens 3 and polarized sheets by looking through the upper polarized lens 1.

Figure 4:
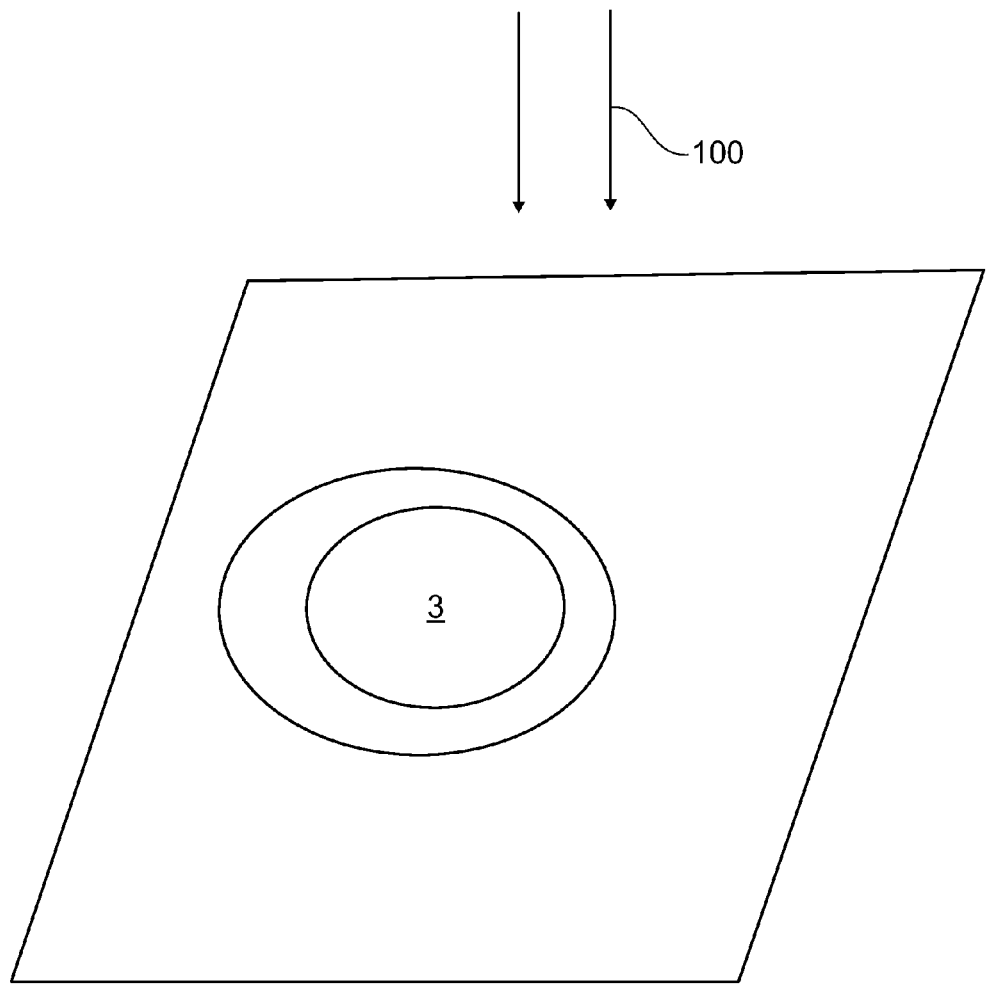
FIG. 4 depicts a lens being tested for stress.

Referring to FIG. 4, lens to be tested 3 is placed with its first side or "A" side in an upward position. The lens to be tested may also be placed within the dial gauge. In one contemplated method, stress of a tested lens is measured by:

Placing the lens 3 within the dial gauge, and without rotation, observing the brightest point upon the lens 3. While observing the lens, rotating the lens until the brightest point previously found become dark brown or some other predetermined color. By angle of rotation is recorded and the thickness of lens at the brightest spot previously found is also recorded.

Stress may be calculated by multiplying the thickness of the lens at the brightest spot previously found by the angle of rotation needed to make the spot brown or some other predetermined color. For example if the brightest spot previously found is 3.14 mm thick and the angle of rotation was 30 degrees, stress would equal 3.14 mm×30.

FIG. 4 shows vectors 100 of observation by an operator who may be viewing the polarized lens 3 to be tested through the upper polarized lens 1.

By use of embodiments disclosed herein, the existence of stress can be derived, as no color changes or no color spots indicate a lack of stress.

The stress location can be derived by where color is seen upon the lens. The amount of stress or magnitude of stress can be found by brightness of spots upon the lens. The concentration of stress is found by observing or measuring the area covered by color.

The observations described above may be made by viewing through the upper polarized lens 1 mounted upon the adjustable bracket.

The disclosed systems and methods find the axis direction of polarization and stress magnitudes with unprecedented precision and accuracy.

Disclosed Embodiments Include

1. A method of measuring the axis of direction and magnitude of stress of a polarized lens, the method having the steps of:

a) placing a first polarized film 20 and a second polarized film 21 upon a lighted and transparent working surface such that the vectors of light transmission of the first and second polarized films are placed at a 30 to 60 degree angle from a guideline, the guideline being an expected direction of polarization of a tested lens;

b) rotating the first and second polarized films until two areas of darkness of equal proportions are observed and then stopping the rotation and using the area between the two areas of equal darkness as a measured axis of polarization of the tested lens;

c) using a dial gauge with a first notch and a second notch and using a first centerline intersecting the first notch and the second notch as the expected axis of polarization, comparing the measured axis of polarization with the first and second notches as a standard of product quality such that a measured axis of polarization falling outside of the first and second notches falls below accepted lens quality for a correct axis of polarization;

d) measuring the magnitude of lens stress by observing an area of brightest light upon the polarized lens to be tested and then rotating the lens until the area of brightest light is observed to become a predetermined color and then multiplying the rotation of the lens by the lens thickness found at the area of brightest light.

2. The method of 1 above wherein observations measuring an axis of polarization are made though an upper polarized lens held above the transparent working surface.

3. The method of 2 above wherein observations measuring lens stress are made through the upper polarized lens held above the transparent working surface.

4. The method of 1 above wherein the angle used within the first and second notches is between 1 to 4 degrees.

5. The method of 1 above wherein the predetermined color is dark brown.

6. A system for finding an axis of polarization and stress of a polarized lens, the system comprising:
a) an adjustable bracket attached to an upper polarized lens, the adjustable bracket attached to a light box, the light box having an internal light source and the light box having a transparent working surface; and
b) the transparent working surface supporting: a first polarized film, a second polarized film, a dial gauge having a first notch and a second notch and the dial gauge rotatable upon the transparent working surface and with markings to measure rotation upon the transparent working surface.

What is claimed is:

1. A method of measuring the axis of direction and magnitude of stress of a polarized lens, the method having the steps of:
a) placing a first polarized film and a second polarized film upon a lighted and transparent working surface such that the vectors of light transmission of the first and second polarized films are placed at a 30 to 60 degree angle from a guideline, the guideline being an expected direction of polarization of a tested lens;
b) rotating the first and second polarized films until two areas of darkness of equal proportions are observed and then stopping the rotation and using the area between the two areas of equal darkness as a measured axis of polarization of the tested lens;
c) using a dial gauge with a first notch and a second notch and using a first centerline intersecting the first notch and the second notch as the expected axis of polarization, comparing the measured axis of polarization with the first and second notches as a standard of product quality such that a measured axis of polarization falling outside of the first and second notches falls below accepted lens quality for a correct axis of polarization; and
d) measuring the magnitude of lens stress by observing an area of brightest light upon the polarized lens to be tested and then rotating the lens until the area of brightest light is observed to become a predetermined color and then multiplying the rotation of the lens by the lens thickness found at the area of brightest light.

2. The method of claim 1 wherein observations measuring an axis of polarization are made though an upper polarized lens held above the transparent working surface.

3. The method of claim 2 wherein observations measuring lens stress are made through the upper polarized lens held above the transparent working surface.

4. The method of claim 1 wherein the angle used within the first and second notches is between 1 to 4 degrees.

5. The method of claim 1 wherein the predetermined color is dark brown.

6. A system for finding an axis of polarization and stress of a polarized lens, the system comprising:
a) an adjustable bracket attached to an upper polarized lens, the adjustable bracket attached to a light box, the light box having an internal light source and the light box having a transparent working surface; and
b) the transparent working surface supporting: a first polarized film, a second polarized film, a dial gauge having a first notch and a second notch and the dial gauge rotatable upon the transparent working surface and the dial gauge having markings to measure rotation upon the transparent working surface.

* * * * *